US011314669B2

(12) United States Patent
Ware et al.

(10) Patent No.: US 11,314,669 B2
(45) Date of Patent: *Apr. 26, 2022

(54) DETERMINISTIC OPERATION OF STORAGE CLASS MEMORY

(71) Applicant: Rambus Inc., Sunnyvale, CA (US)

(72) Inventors: Frederick A. Ware, Los Altos Hills, CA (US); Brent Haukness, Monte Sereno, CA (US)

(73) Assignee: Rambus Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/660,768

(22) Filed: Oct. 22, 2019

(65) Prior Publication Data

US 2020/0142845 A1   May 7, 2020

Related U.S. Application Data

(63) Continuation of application No. 15/376,507, filed on Dec. 12, 2016, now Pat. No. 10,467,157.

(60) Provisional application No. 62/268,436, filed on Dec. 16, 2015.

(51) Int. Cl.
G06F 13/16 (2006.01)

(52) U.S. Cl.
CPC .............................. G06F 13/1689 (2013.01)

(58) Field of Classification Search
CPC ....... G06F 13/1689; G11C 7/22; G11C 7/222; G11C 8/18; G11C 11/1693; G11C 11/2293; G11C 11/4076; G11C 13/0061; G11C 16/32
See application file for complete search history.

(56) References Cited

U.S. PATENT DOCUMENTS

| 4,520,458 | A | 5/1985 | Hattori et al. |
| 5,261,110 | A | 11/1993 | Mitsuishi et al. |
| 5,313,650 | A | 5/1994 | Mitsuishi et al. |
| 5,864,696 | A * | 1/1999 | McClure .................. G11C 7/22 |
| | | | 711/167 |
| 6,154,796 | A | 11/2000 | Kuo et al. |
| 6,256,713 | B1 | 7/2001 | Audityan et al. |
| 6,415,366 | B1 * | 7/2002 | Chen .................. G06F 13/1642 |
| | | | 711/156 |
| 6,601,131 | B2 | 7/2003 | Sezaki et al. |
| 7,093,071 | B2 | 8/2006 | Rudelic |
| 7,100,020 | B1 * | 8/2006 | Brightman .............. H04L 49/10 |
| | | | 709/231 |
| 7,475,292 | B2 | 1/2009 | Avritzer et al. |
| 7,881,145 | B2 | 2/2011 | Lee et al. |

(Continued)

*Primary Examiner* — Yaima Rigol
(74) *Attorney, Agent, or Firm* — Lance Kreisman; Peninsula Patent Group

(57) ABSTRACT

Memory controllers, devices, modules, systems and associated methods are disclosed. In one embodiment, a memory controller is disclosed. The memory controller includes write queue logic that has first storage to temporarily store signal components of a write operation. The signal components include an address and write data. A transfer interface issues the signal components of the write operation to a bank of a storage class memory (SCM) device and generates a time value. The time value represents a minimum time interval after which a subsequent write operation can be issued to the bank. The write queue logic includes an issue queue to store the address and the time value for a duration corresponding to the time value.

20 Claims, 11 Drawing Sheets

(56) References Cited

U.S. PATENT DOCUMENTS

| | | |
|---|---|---|
| 8,250,328 B2 | 8/2012 | Farrell et al. |
| 8,300,477 B2 | 10/2012 | Haukness et al. |
| 8,645,617 B2 | 2/2014 | Shaeffer et al. |
| 9,093,160 B1 | 7/2015 | Ellis et al. |
| 9,158,672 B1 | 10/2015 | Zheng et al. |
| 9,710,226 B1 | 7/2017 | Zheng et al. |
| 9,785,360 B1 | 10/2017 | Ravindranath et al. |
| 2001/0042225 A1* | 11/2001 | Cepulis ................ G06F 11/006 714/25 |
| 2006/0209612 A1 | 9/2006 | Kajigaya |
| 2007/0028028 A1 | 2/2007 | Wallner et al. |
| 2009/0089517 A1* | 4/2009 | Imai ................... G06F 13/1689 711/154 |
| 2011/0060875 A1 | 3/2011 | Haukness et al. |
| 2012/0324147 A1 | 12/2012 | Lai |
| 2013/0318285 A1 | 11/2013 | Pignatelli |
| 2014/0006742 A1 | 1/2014 | Tokumitsu |
| 2015/0100723 A1 | 4/2015 | Brandl |

* cited by examiner

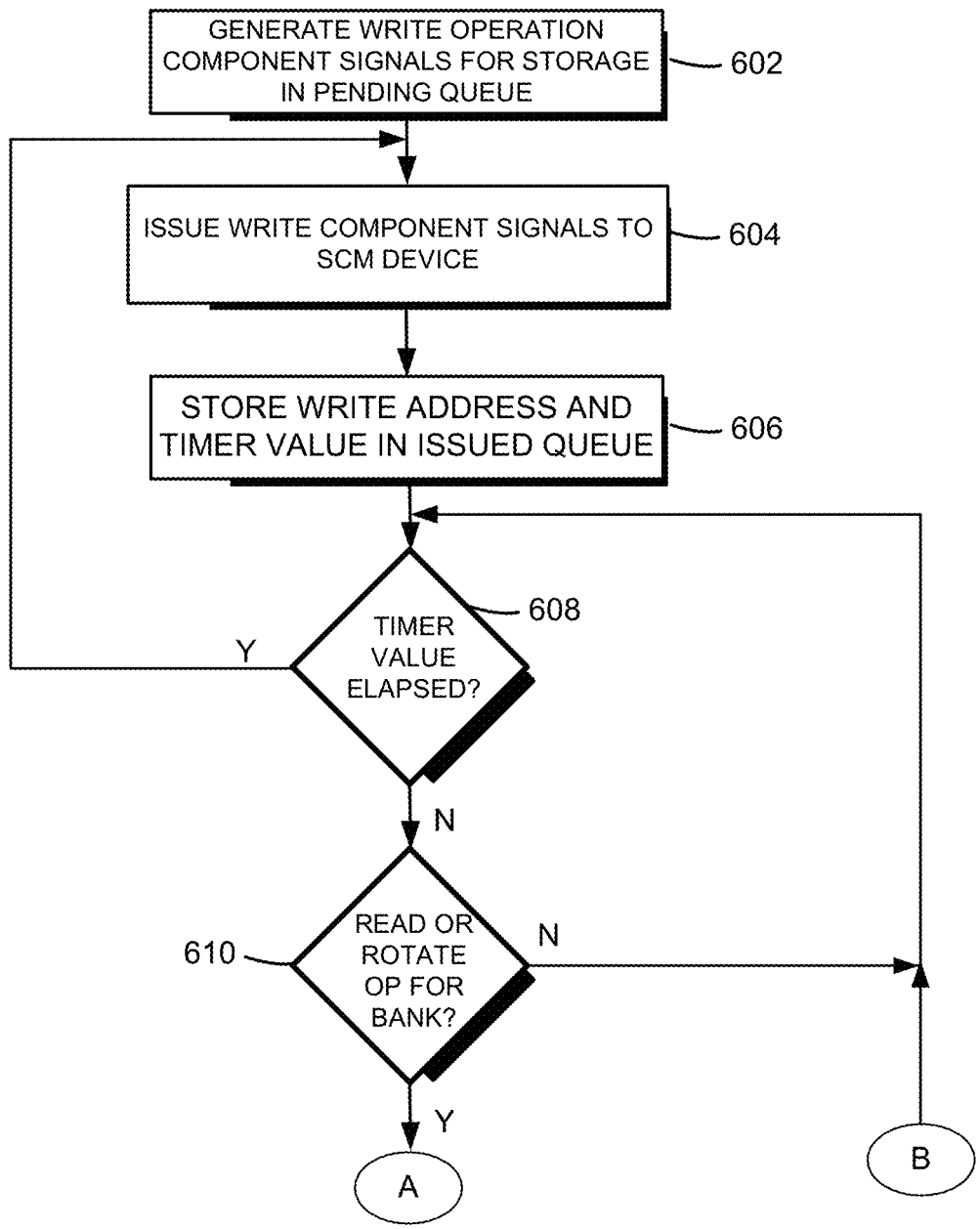

DETERMINISTIC OPERATION OF STORAGE CLASS MEMORY

CROSS-REFERENCE TO RELATED APPLICATIONS

This application is a Continuation that claims priority to U.S. application Ser. No. 15/376,507, filed Dec. 12, 2016, DETERMINISTIC OPERATION OF STORAGE CLASS MEMORY, which is a Non-Provisional that claims priority to U.S. Provisional Application No. 62/268,436, filed Dec. 16, 2015, entitled DETERMINISTIC OPERATION OF STORAGE CLASS MEMORY, all of which are incorporated herein by reference in their entirety.

TECHNICAL FIELD

The disclosure herein relates to memory modules, memory controllers, memory devices, and associated methods.

BACKGROUND

Successive generations of dynamic random access memory components (DRAM) have appeared in the marketplace with steadily shrinking lithographic feature size. As a result, the device storage capacity from each generation has increased. However, it is increasingly becoming more difficult to scale DRAM devices and obtain sufficient capacitive performance for charge storage. DRAM device manufacturing can also be costly.

Various non-volatile memory technologies, such as resistive random access memory (RRAM) and phase change random access memory (PCRAM), to name a few, are relatively inexpensive to manufacture. However, many of the non-volatile memory technologies have yet to attain the performance of their DRAM counterparts. In particular, write operations for such memory technologies often exhibit non-deterministic write times, and undesirable latency characteristics.

BRIEF DESCRIPTION OF THE DRAWINGS

Embodiments of the disclosure are illustrated by way of example, and not by way of limitation, in the figures of the accompanying drawings and in which like reference numerals refer to similar elements and in which:

FIG. 6A illustrates one embodiment of a flow chart of steps involving a write data transfer between the memory controller and the SCM module.

DETAILED DESCRIPTION

Memory modules, memory controllers, devices and associated methods are disclosed. In one embodiment, a memory controller is disclosed that includes write queue logic that has first storage to temporarily store signal components of a write operation. The signal components include an address and write data. A transfer interface issues the signal components of the write operation to a bank of a storage class memory (SCM) device and generates a time value. The time value represents a minimum time interval after which a subsequent write operation can be issued to the bank. The write queue logic includes an issue queue to store the address and the time value for a duration corresponding to the time value. By employing the time value in managing the duration of write operations for SCM memories, the write operations may be more deterministic, enabling pipelined operations and thereby improving overall performance. Other embodiments utilize a memory command protocol that enables read operations to interrupt write operations in process, thereby providing deterministic read operations in an SCM memory.

Figure 1:
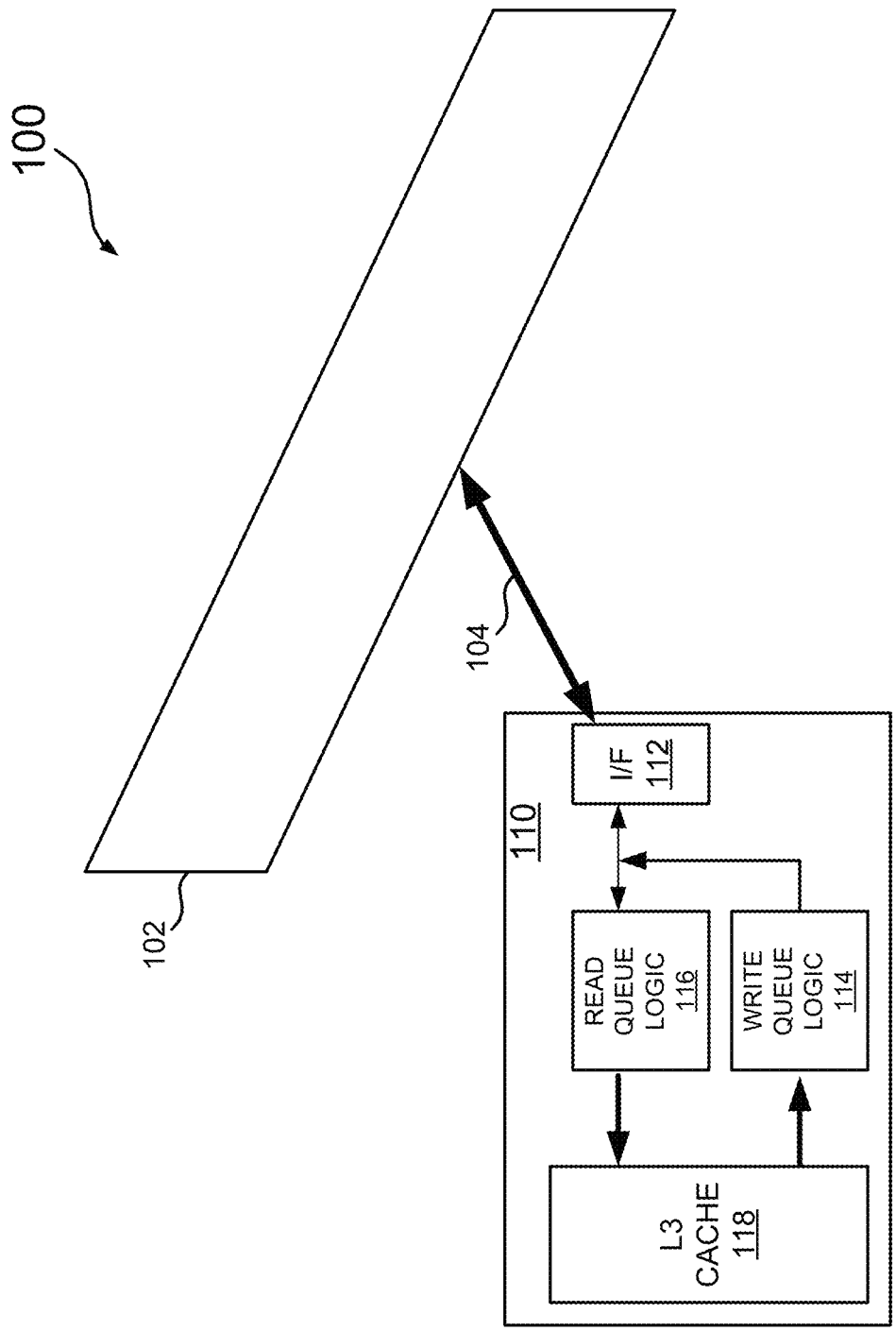
FIG. 1 illustrates one embodiment of a memory system that employs a memory controller, and a storage class memory (SCM) module.

Referring to FIG. 1, one embodiment of a memory system, generally designated 100, employs at least one memory module 102 coupled to memory control circuitry 110 via a signaling link 104. The module 102 may be of the type that includes storage class memory (SCM), such as resistive random access memory (RRAM), phase change random access memory (PCRAM), and flash, to name but a few. The architecture described herein renders it possible to improve the performance of storage class memory in a manner that allows for use of SCM memory modules with DRAM modules with minimal performance loss.

With continued reference to FIG. 1, one specific embodiment of the memory control circuitry 110 may include, e.g., a discrete memory controller separate from a requestor integrated circuit (IC), or any IC that controls memory devices, such as DRAM and nonvolatile memory devices, and could be any type of system-on-chip (SoC). One embodiment of the memory control circuitry 110 employs an interface 112 to transmit and receive signals to and from the memory module 102. Write data signals that are transmitted by the interface are first queued by write queue logic 114, more fully described below. The memory control circuitry 110 includes read queuing logic 116 to manage the issuance and receipt of read commands and data. A level 3 cache 118 interfaces the memory control circuitry to a host processing resource (not shown). For one embodiment, status logic 115 detects an alert signal from the SCM memory module 102 in the event a write operation fails, as more fully described below.

Figure 2:
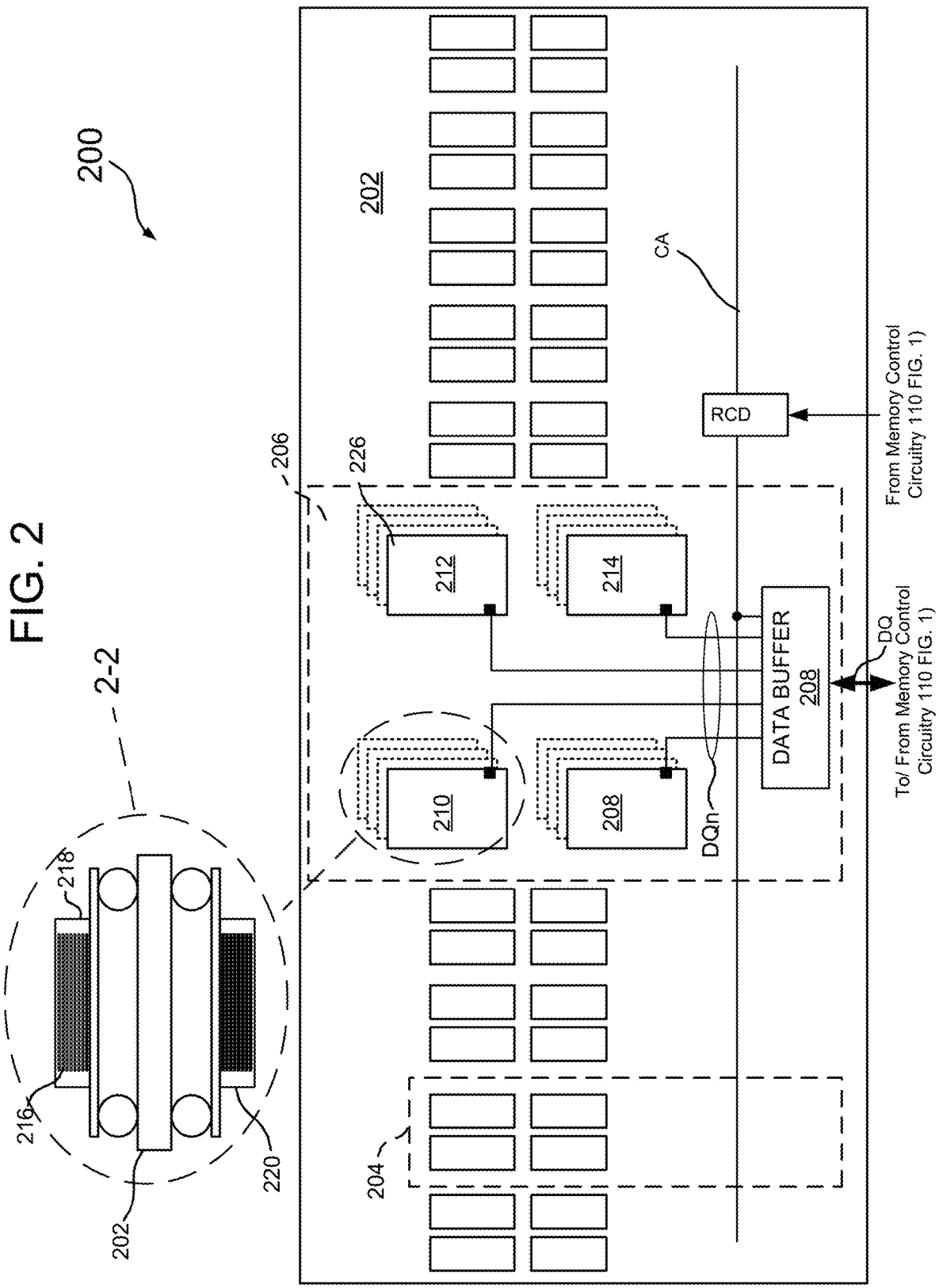
FIG. 2 illustrates one embodiment of the storage class memory (SCM) module shown in FIG. 1.

FIG. 2 illustrates one specific embodiment of a storage class memory (SCM) module, generally designated 200, that may be suitable for inclusion in the system 100 of FIG. 1. The SCM memory module 200 includes a substrate 202 that mounts multiple groups of components, such as at 204 (in phantom), to achieve a desired module bandwidth for a memory system with similar (SCM) or different (such as DRAM) memory modules. A more detailed view of one of the groups of components is shown at 206, with the understanding that each group employs a similar structure.

Further referring to FIG. 2, for one embodiment, each group of components 206 includes a data buffer 208 that interfaces stacked SCM memory devices 208, 210, 212 and 214 with the memory control circuitry 110 (FIG. 1) via a first primary nibble group DQ. For embodiments that employ multiple memory modules, each data buffer component 208 may also interface with a primary nibble group DQ that is shared with another memory module (not shown). For one embodiment, each data nibble group includes four data DQ links and a differential strobe DQS link (not shown). A secondary data DQ nibble group DQn couples each data buffer component 208 to the stacked SCM memory devices 208, 210, 212 and 214.

In some embodiments, the SCM memory devices 208, 210, 212 and 214 interface with the memory control circuitry 110 directly, without the use of the data buffer circuitry 208. In other embodiments, the data buffer circuitry may be merged into a smaller number of components that include a larger number of primary nibble interfaces DQ.

Further referring to FIG. 2, for one specific example, each set of SCM memory devices, such as at 210, includes one or more stacks of SCM memory die. As noted earlier, the memory die may be of a nonvolatile-type of memory technology other than DRAM, such as such as resistive random access memory (RRAM), phase change random access memory (PCRAM), and flash, to name but a few. Each stack of devices may contain, for example, eight SCM memory components. One example of a stacked set of devices is shown in the magnified view 2-2, illustrating stacked SCM memory components 216 within a single package 218. For some configurations, the opposite side of the SCM module substrate 202 may mount memory components, such as at 220. The interface of each SCM memory component may be connected in parallel using through-silicon-vias, wire bonding, any other connection method. Other stacking configurations such as package-on-package stacking are also possible.

With continued reference to FIG. 2, the SCM memory module 200 includes a control/address (CA) buffer component RCD that drives intermediate CAi links connecting to each data buffer component, such that each data buffer component drives secondary CAn links (not shown) to each SCM memory stack. In an alternative embodiment, the CA buffer RCD may drive secondary CAn links to each SCM memory stack directly.

Figure 3:
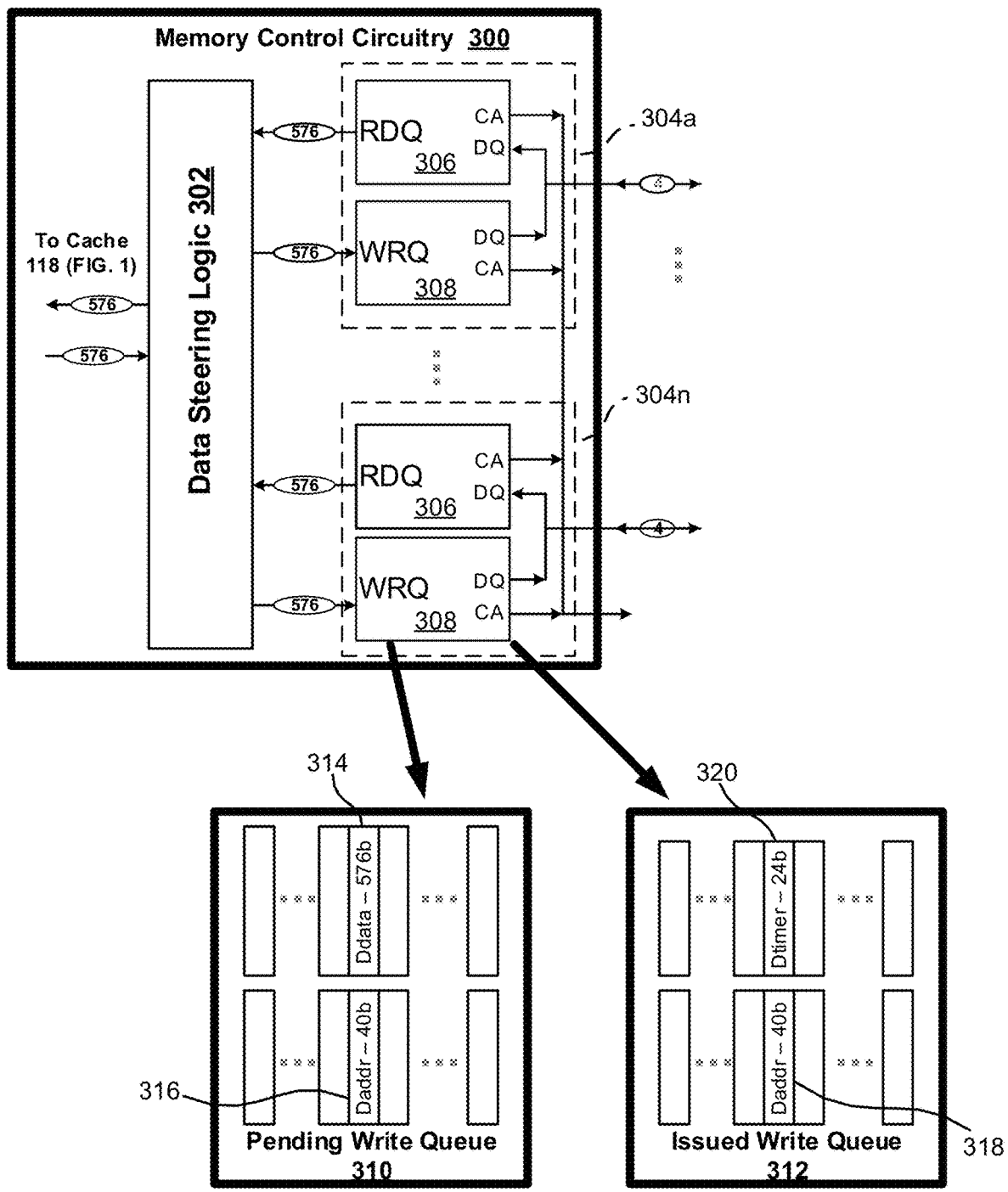
FIG. 3 illustrates further detail of one embodiment of the memory controller of FIG. 1.

FIG. 3 illustrates further detail of one embodiment of memory control circuitry, generally designated 300, that corresponds to the memory control circuitry 110 of FIG. 1. The memory control circuitry 300 includes data steering logic 302 that interfaces with the Level 3 cache 118 (FIG. 1). The steering logic 302 directs data transfers at a column granularity, such as for example 576 bits, between the cache and various nibble groups 304a-304n.

Further referring to FIG. 3, the nibble groups 304a-304n are organized into a plurality of identical logic resources that each include read queue logic 306 and write queue logic 308 (corresponding to the read queue logic and write queue logic 116 and 114 of FIG. 1). The read queue logic 306 generally manages read transactions for the memory control circuitry 110. The write queue logic 308 includes a pending write queue 310 and an issued write queue 312. The pending write queue 310 includes storage in the form of first-in-first-out (FIFO) or other register storage to temporarily store data, at storage locations 314, and corresponding address information, at storage locations 316, for one or more desired write transactions in a given priority order, depending on one or more applicable policies. The issued write queue 312 includes storage similar to the pending write queue, but includes locations, at 318, for storing the address of the SCM memory space to where the write was issued, and locations, at 320, to store a corresponding timer value. The timer value represents a minimum time interval after which a subsequent write transaction may be dispatched to the same bank.

Further referring to FIG. 3, the timer value may be in the form of a multi-bit count that can be fed to a counter or other time measurement device. The value may be chosen to represent a worst-case time interval for carrying out a complete SCM write operation to a given bank of SCM memory. Upon expiration of the timer value, the memory control circuitry 110 can assume that the write operation at the SCM memory component is complete and may issue a subsequent write operation to the same bank of SCM memory. SCM memory cells often exhibit non-deterministic programming (write) characteristics such that write times for like memory cells are inconsistent. Thus, by selecting a timer value that accounts for an expected worst-case programming duration, the non-deterministic nature of the SCM memory cells may be more predictable.

Figure 4:
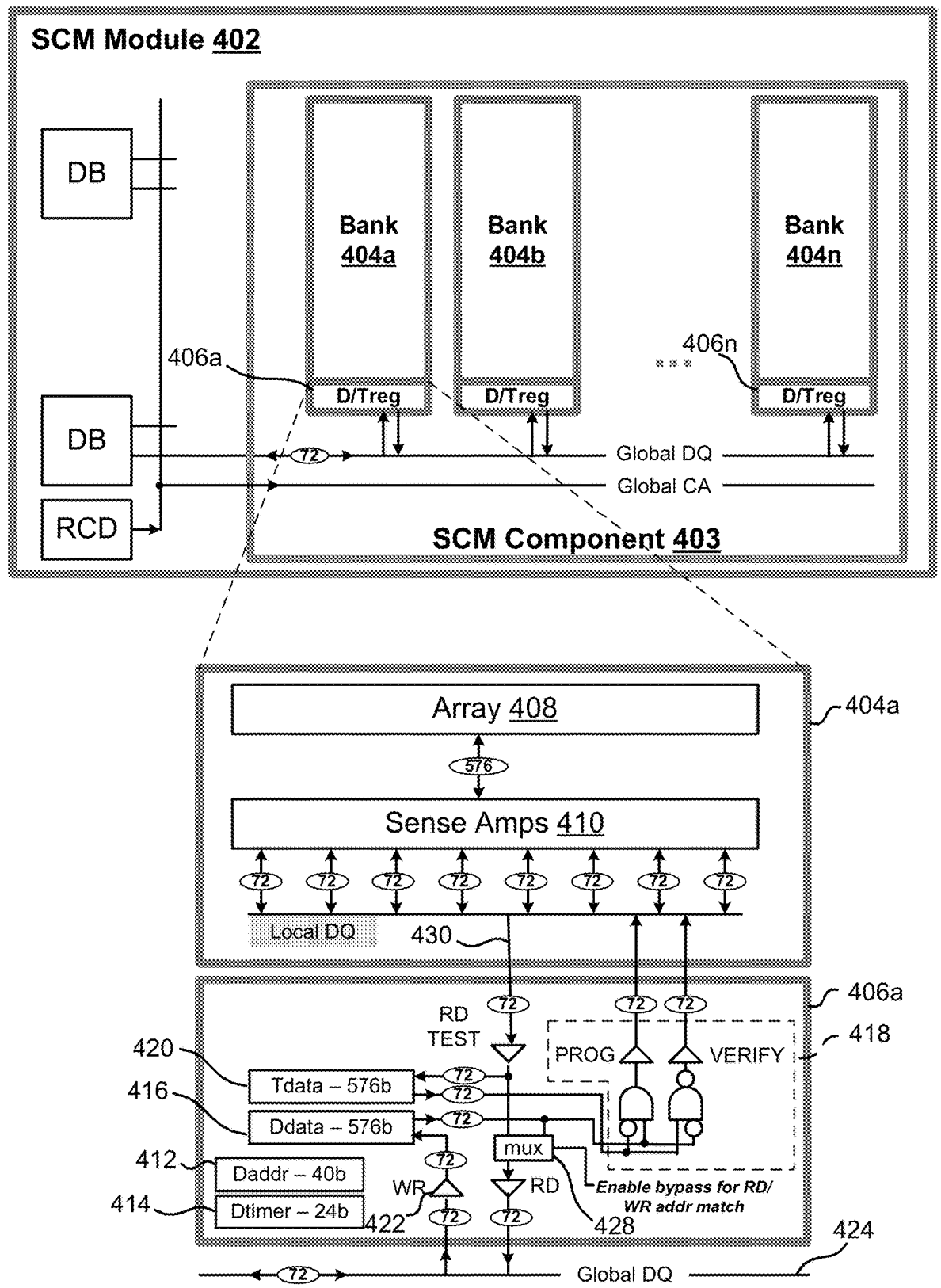
FIG. 4 illustrates further detail of one embodiment of the storage class memory (SCM) module of FIG. 2, with emphasis on one embodiment of a storage class memory device.

FIG. 4 illustrates further detail for one embodiment of the circuitry employed in each SCM memory component utilized on an SCM module 402 (corresponding to the memory module 200 of FIG. 2). Each component 403 includes memory core and interface circuitry arranged into multiple banks 404a-404n, with corresponding register storage 406a-406n. Each bank 404 includes an array of SCM memory cells 408 that may be organized into pages and bit lines, with multiple sense amplifiers 410 that detect the states of the storage cell bits in an addressed page (or row) of the array.

Further referring to FIG. 4, the register storage 406a includes storage in the form of registers, buffers or the like to store various pieces of information for optimally carrying out write transactions. For instance, a first storage location Daddr, at 412 stores an address corresponding to the addressed memory space for a current write transaction. A second storage location Dtimer, at 414, stores a timer value associated with the write address that corresponds to the timer value stored by the issued write queue in the memory control circuitry for the same write transaction. A third storage location Ddata, at 416, temporarily stores the write data that accompanied the write address. The interface circuitry that corresponds to each bank includes XOR logic 418 that is involved in the programming of the write data into a selected page in accordance with a program/verify write command protocol that is suitable for the specific SCM memory utilized. A fourth storage location Tdata, at 420, stores the states of data bits in the addressed page as sensed during verify operations that take place during the write programming.

With continued reference to FIG. 4, the third storage Ddata, at 416, includes an input coupled to a write data path having receiver circuitry 422 coupled to a global data bus 424. An output from the third storage feeds the XOR program/verify write logic 418 and an input to a multiplexer 428 that allows for a quick read transaction in certain circumstances that are more fully described below. A read path 430 couples to the sense amplifiers 410 to provide read data from an addressed page to the global data bus 424. The fourth storage Tdata, at 420, receives the read data during verify operations during the incremental write programming operations.

Operation of the memory system described above generally involves managing various write and read transactions with the memory control circuitry in a manner that maximizes system performance. Write transactions to SCM memory components, while having relatively long write latencies, are issued in a deterministic manner to allow for efficient pipelining. Low-latency read operations are given priority to interrupt a current write operation, thus providing deterministic read transaction latencies, and improving read transaction performance.

As noted above, various aspects of the circuitry described herein enable an SCM memory module to be used in a memory system that may or may not include one or more DRAM modules. To support the inclusion of SCM memory modules into the system, for write operations the memory control circuitry generally operates in accordance with the signal flow shown in FIG. 5, with more specific steps shown in the flowcharts of FIGS. 6A-6B, and the timing charts of FIGS. 7-10. For purposes of clarity, specific operation steps are described from the perspective of an SCM memory technology that employs a multiple step program/verify operation. Other SCM memory types may have specific write and read operational steps that vary, but which operate consistent with the principles described herein. For example, the principles described herein work equally well for SCM memory technologies that utilize a single program/verify cycle, or exhibit a longer write programming step without a verify operation.

Figure 5:
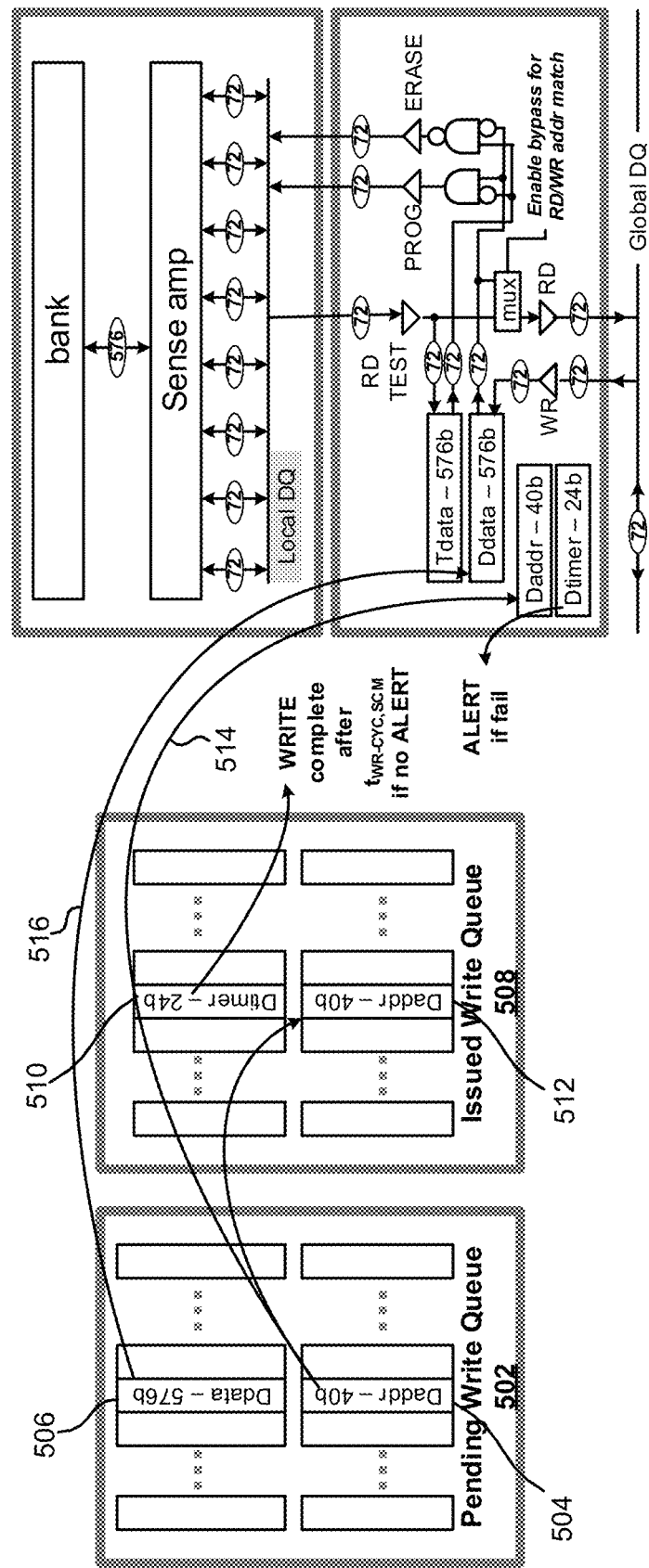
FIG. 5 shows one embodiment of the interrelationship between the write queues of FIG. 3, and the SCM memory device of FIG. 4 during operation.

Referring now to FIGS. 5 and 6A, for write data that is to be transferred and stored into an SCM memory module, the memory control circuitry generates write operation component signals, at 602, such as the specific address for the SCM storage space, and data bits associated with the write transaction, and stores the component signals in the pending write queue. The storage of the address and data signals are shown in FIG. 5, respectively, in pending write queue 502, at 504 and 506. At an appropriate scheduled timing interval, the memory control circuitry issues the write component signals to the SCM module, at 604 (FIG. 6), and stores the write address and the timer value in the issued write queue, at 606. The storage of the timer value and address signals are shown in FIG. 5, respectively, in issued write queue 508, at 510 and 512. Storing the timer value includes initiating a countdown or other measurement of the time represented by the timer value. The address and data are also dispatched to the SCM module, as shown by the signal flow at 514 and 516. In some embodiments, the timer value may also be sent with the address and data, but in other embodiments, the timer value may be generated at the SCM component with a value similar to that generated at the memory control circuitry.

Further referring to FIG. 6A, once the write signal components are dispatched to the SCM memory, then the addressed SCM memory component carries out an iterative sequence of program/very operations to write the data to the addressed page of the selected bank of SCM memory. During the program/verify operations, the memory control circuitry and the SCM memory component periodically monitor the timer value, at 608. Once the timer value expires, and no alert regarding an unsuccessful operation is detected, then a subsequent write transaction may be issued to the same bank by issuing another set of write component signals, at 604.

Generally, for many SCM memory technologies, read operations occur much faster than write operations. Thus, by allowing intervening read operations to take place during a write operation (by interrupting the write operation), performance may be enhanced. Additionally, allowing for read transaction interrupts significantly improves deterministic latencies for read operations since the latency depends only on the time of the interrupt and the time of the read operation itself. With continued reference to FIG. 6A, and also to FIG. 6B, while monitoring the timer value, at 608, the memory control circuitry and the SCM memory component also monitor whether a read operation or rotation operation has been dispatched for the same bank currently handling the write operation, at 610. If no intervening read or rotate operation has issued, then the timer monitoring continues, at 608. However, if an intervening read or rotation operation has been issued, then the steps shown in FIG. 6B are carried out.

Figure 6B:
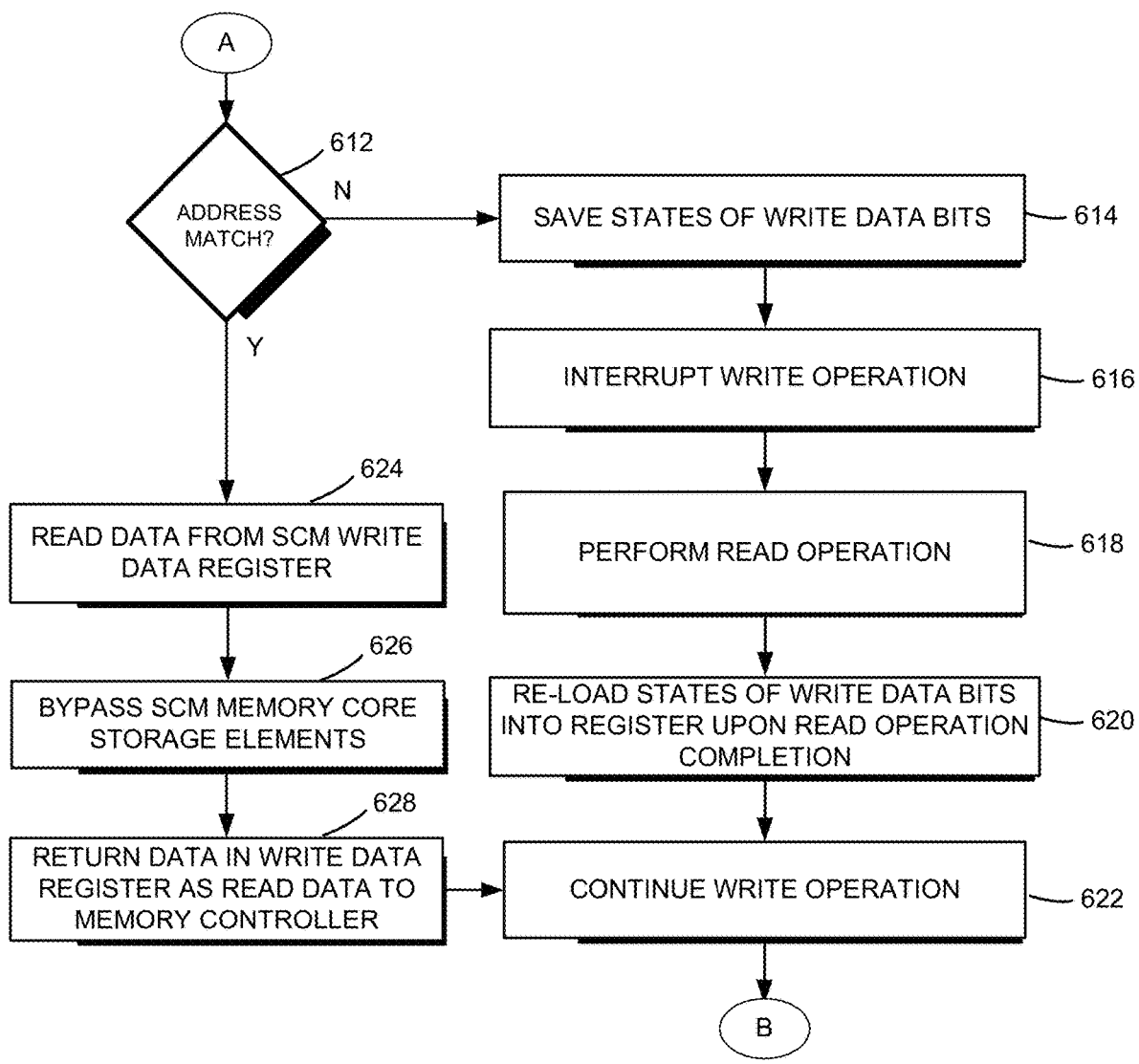
FIG. 6B illustrates further steps relating to the write transfer operations of FIG. 6A.

With continued reference to FIG. 6B, in the event that an intervening read command is issued by the memory control circuitry to the same bank of the SCM memory, then a determination is made, at 612, as to whether the read operation is directed to the same address as the current write operation. If not, then the SCM memory component saves the states of the write data bits in write buffer storage, at 614, and interrupts the write operation, at 616. The read operation may then be performed, at 618. Once the read transaction is completed, then the states of the write data bits may be re-loaded into the page register, at 620, to continue the write programming operation, at 622. Note that the timer value associated with the write operation may be adjusted by an amount of time corresponding to the duration of the intervening read transaction.

Further referring to FIG. 6B, for the case where the address of the intervening read transaction matches the address for the current write operation, then the contents of the SCM write data register are accessed, at 624, and provided as the read data, effectively bypassing an access to the SCM memory core, at 626. The data may then be returned to the memory control circuitry as the requested read data, at 628, and the write operation able to resume, at 622.

Figure 7:
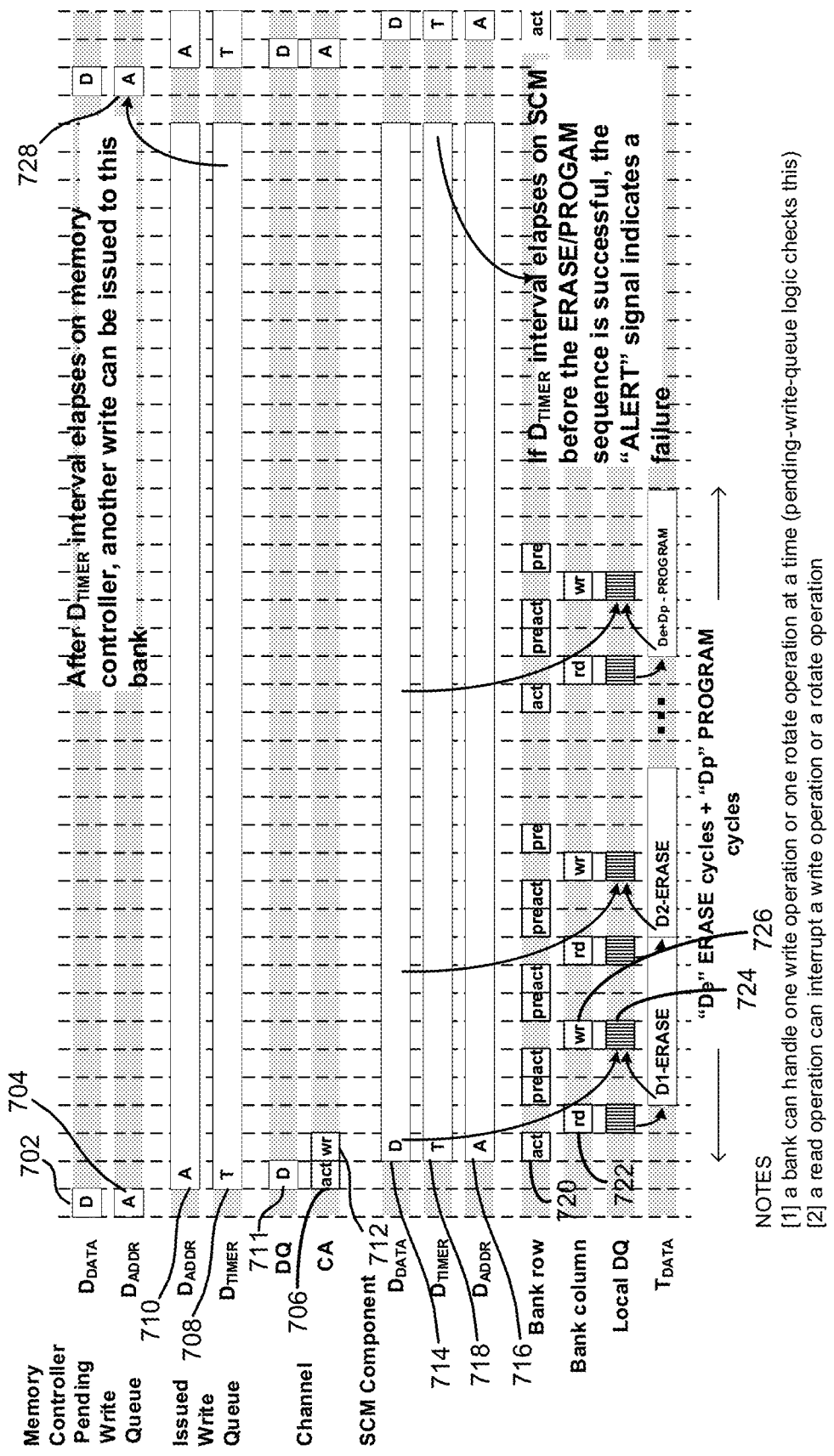
FIG. 7 illustrates one embodiment of a timing chart relating to a write data transfer similar to that of FIG. 6A.

FIG. 7 illustrates a timing chart showing the various timings for a write operation consistent with the write operations discussed above with respect to FIGS. 5 and 6A. The chart assumes that respective data and address components for a write operation are stored in a pending write queue, at 702 and 704. At 706, the memory control circuitry initiates the write transaction through issuance of an activate command "act" along a command/address bus CA, which sets in motion 1) the generation and storage of a timer value in a timer register DTimer, at 708, 2) the storage of a copy of the address to which the data is being written in an address register $D_{ADDR}$, at 710, 3) the transfer of the write data along a primary data path DQ, at 711, and 4) the generation of a write command "wr" along the command/address CA path, at 712.

Further referring to FIG. 7, at the addressed SCM memory component, the transferred data and address information is temporarily stored in respective write data $D_{DATA}$ and write address $D_{ADDR}$ registers, at 714 and 716. A timer value (either generated by the SCM component, or transferred from the controller circuitry to the SCM component) corresponding to the timer stored on the memory control circuitry is stored in a timer register $D_{TIMER}$, at 718. The addressed page of the SCM component then undergoes a sequence of program/verify operations. The program/verify operations generally each involve activating the addressed page (or row), at 720, and performing a read on the page, at 722, followed by XORing the write data from the write data register $D_{DATA}$ with the sensed data loaded into register $T_{DATA}$ from the read operation, at 724, and applying a program pulse (write "wr") for the data bits not already programmed, at 726. This sequence of read, XOR, and write operations iteratively continues until all of the bits are successfully programmed into the page. The sequence will typically be completed before expiration of the timer value. However, if the timer value expires before all of the bits are successfully programmed, then an alert signal is sent back to the memory control circuitry, indicating a failure in the write operation. The absence of an alert signal provides the memory control circuitry with an indication that the write operation was successful. Consequently, following expiration of the timer value, a subsequent write transaction may be dispatched to the same bank of the SCM component, such as at 728.

Figure 8:
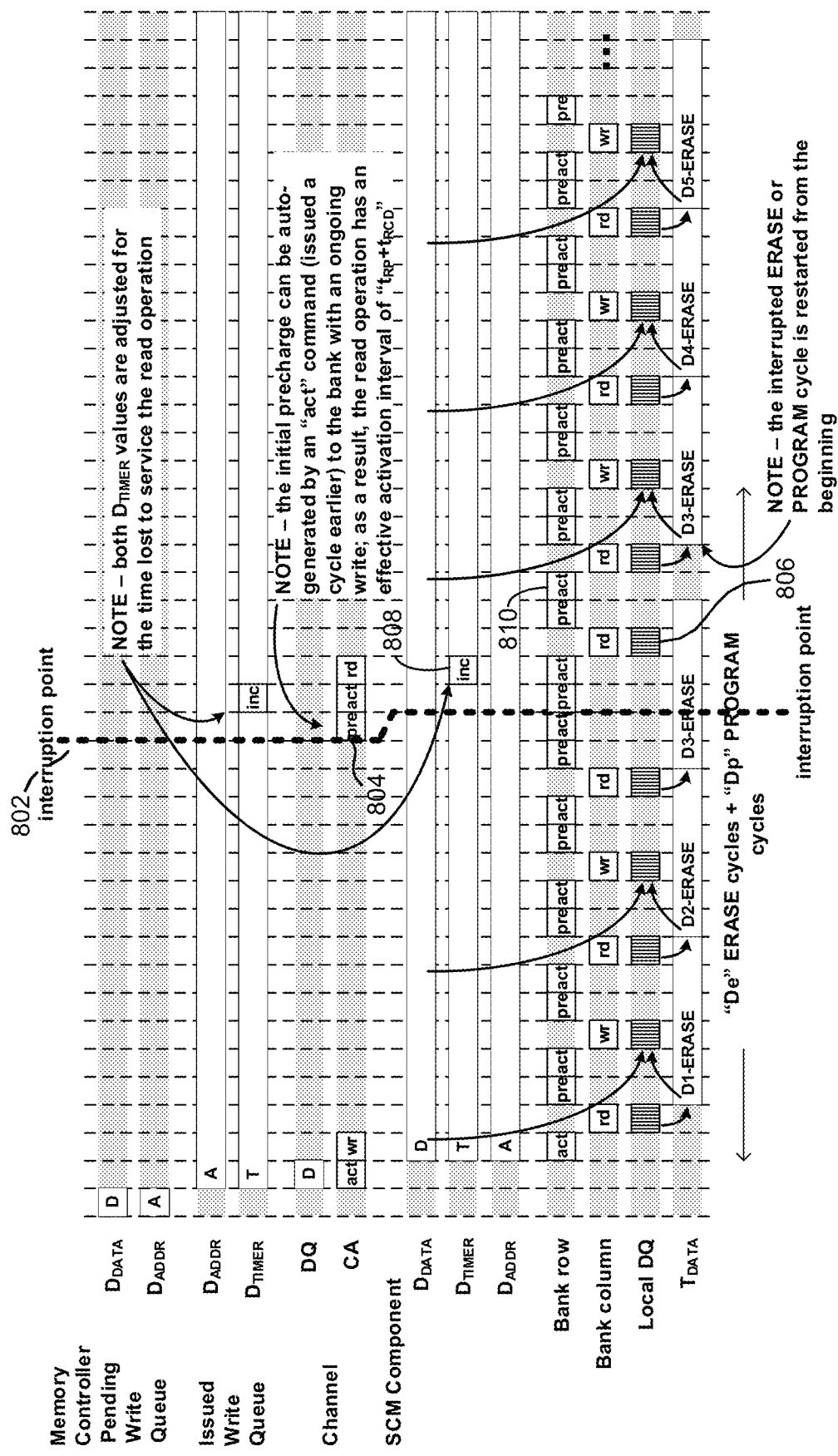
FIG. 8 illustrates one embodiment of a timing chart relating to a write data transfer similar to that of FIG. 7, but interrupted by a read operation.

FIG. 8 illustrates a timing chart similar to the chart shown in FIG. 7, but including additional timings associated with a read operation that intervenes during a current write operation. Generally speaking, a given write operation is initiated by the memory control circuitry in much the same manner as described with respect to FIG. 7, with the SCM component iteratively carrying out a sequence of several program/verify operations. However, at an interruption point, such as at 802, the memory control circuitry issues read command signal components (such as a precharge signal, an activate signal, and a read command), at 804, along the command/address bus CA. The read data is accessed from the local data bus "Local DQ", at 806. For one embodiment, the timer values associated with the write operation (at both the memory control circuitry and the SCM component) are modified by a duration corresponding to the read operation interval, at 808. Upon completion of the intervening read transaction, the program/verify operations resume, at 810, restarting whichever given program/verify cycle was interrupted by the read operation.

Figure 9:
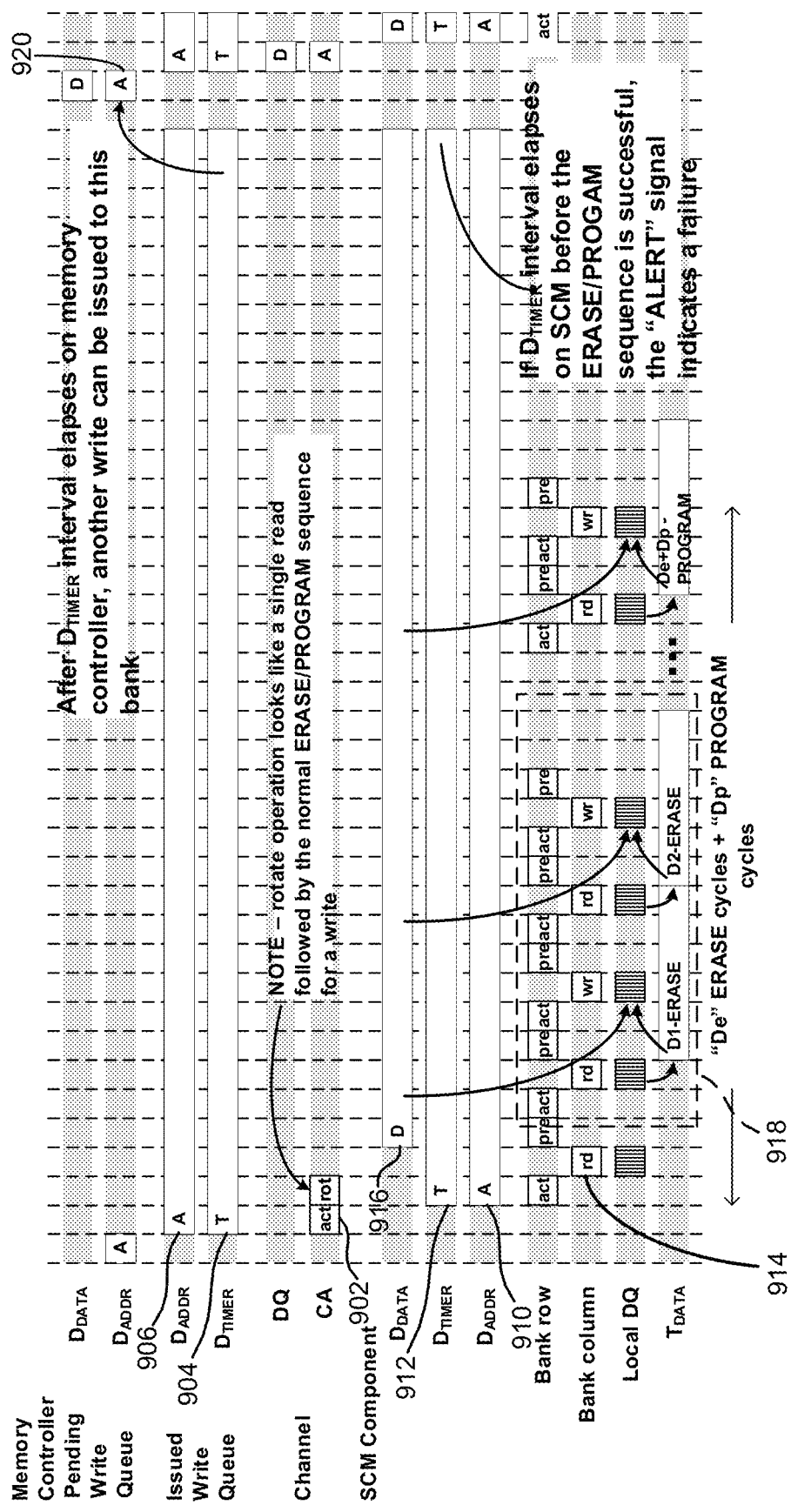
FIG. 9 illustrates a timing diagram associated with a rotation operation.

FIG. 9 illustrates a timing chart that illustrates various timings involved in a rotate operation. Generally, for SCM memory technologies, wear leveling techniques may provide enhanced endurance characteristics for the SCM memory cells. Periodically rotating data throughout a given SCM memory array more evenly wears the SCM memory cells in this regard. Generally speaking, a rotation operation includes signal components similar to a read operation followed by a program/verify sequence of operations normally associated with a write operation as described above. The operation is initiated by the memory control circuitry issuing an activate signal "act" followed by a rotation command "rot", at 902. To provide a deterministic characteristic for the rotation operation, a timer value is generated, at 904, along with an address for the rotation, at 906. The SCM component receives the activate command, at 908, and stores a copy of the write address, at 910, and generates a timer value, at 912. A first read transaction, at 914, then reads stored data from a selected page and stores the data in the write page register $D_{DATA}$, at 916. A sequence of program/verify cycles, such as that shown at 918, are then performed to write the read data to the addressed page. Expiration of the timer provides an indication of a successful rotation of data from one page location to another, allowing another write operation to be issued to the same bank, at 920. However, if the timer value expires before the rotation operation completes, then an alert signal is provided to the status logic on the memory control circuitry.

Figure 10:
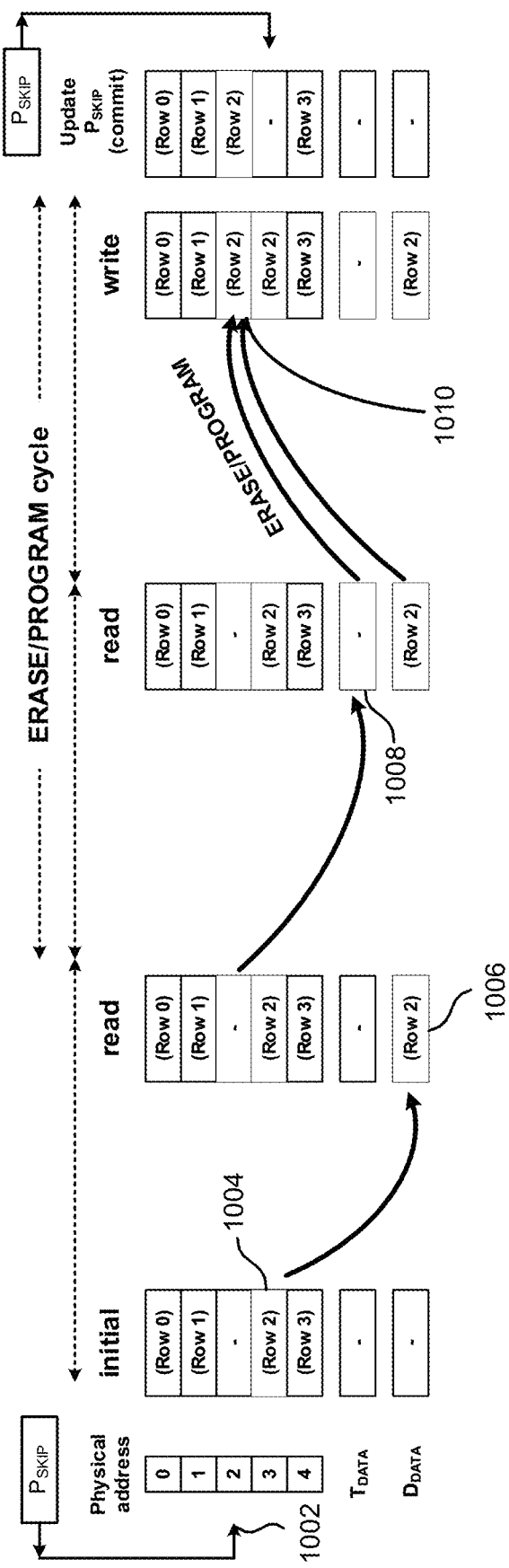
FIG. 10 illustrates a block diagram corresponding to the rotation timing chart of FIG. 9.

FIG. 10 shows further detail regarding the sequential programming operations that are carried out by the SCM memory device during a rotate operation. Generally, the rotation operation takes a group of pages, or rows, and sequentially shifts the data from one page to the next. At an initial state, rotation logic in the memory component provides a pointer, at 1002, indicating which one of the group of pages will be skipped in a given rotation operation. A first read operation is carried out for a selected page, such as "Row 2", at 1004. The data read from the page is provided to the write data register $D_{DATA}$, at 1006. A subsequent read operation takes place to provide the data from the "skipped" row into the program/verify buffer $T_{DATA}$, at 1008. The data from the two buffers is then XORed, and programmed via one or more pulse sequences, at 1010, to write the data originally in "Row 2" into the skipped row indicated by the pointer. Once the rotated data is successfully written, the pointer sequences to a next page. Rotation sequences such as this may be carried out periodically over, for example, seconds, minutes, or even hours, depending on the circumstances.

Those skilled in the art will appreciate that the architecture described above enables storage class memory to exhibit performance characteristics similar to DRAM memories by instilling a deterministic timer value for write operations and allowing for intervening read operations. By improving the performance of SCM memories, employing SCM memories with DRAM memories becomes more viable.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

We claim:

1. A memory module, comprising:
    a substrate;
    a plurality of memory devices disposed on the substrate, each of the plurality of memory devices comprising
        an array of memory cells organized into at least one bank;
        a write data register to temporarily store write data associated with a write operation directed to the at least one bank; and
        a timer register to store a timer value associated with the temporarily stored write data, the timer value representing a time interval beginning with initiation of the write operation by a memory controller and ending with the write data written to the at least one bank, wherein a subsequent write operation to the bank is constrained until after expiration of the timer value.

2. The memory module according to claim 1, wherein the initiation of the write operation is based on receipt of an activation command at the memory module.

3. The memory module according to claim 1, wherein the memory module receives signal components of a read operation directed to the at least one bank before expiration of the timer value.

4. The memory module according to claim 3, wherein the timer value is increased by an amount corresponding to a read time interval associated with the read operation.

5. The memory module according to claim 1, further comprising:

circuitry to generate a status signal indicating a failure of the write operation before expiration of the minimum time interval.

6. The memory module according to claim 5, wherein an absence of generating the status signal within the minimum time interval indicates a successful write operation.

7. The memory module according to claim 1, wherein the plurality of memory devices comprises storage class memory (SCM) devices.

8. The memory module according to claim 1, wherein the write operation comprises a sequence of program/verify operations.

9. The memory module according to claim 1, further comprising:
    address comparison logic configured to compare an address of a read operation to an address associated with the write operation, the read operation received subsequent to the write operation; and
    bypass logic configured to, in response to the address comparison logic generating a match condition, read the write data in the write data register and return the write data as read data to the memory controller.

10. A method of operation in a memory module, the memory module including a plurality of memory devices, the method comprising:
    temporarily storing write data in a write data register, the write data associated with a write operation directed to at least one bank in at least one of the plurality of memory devices; and
    storing a timer value in a timer register, the timer value associated with the temporarily stored write data, the timer value representing a time interval beginning with initiation of the write operation by a memory controller and ending with the write data written to the at least one bank, wherein a subsequent write operation to the bank is constrained until after expiration of the timer value.

11. The method of claim 10, wherein the initiation of the write operation is based on receipt of an activation command at the memory module.

12. The method of claim 10, further comprising:
    receiving signal components of a read operation directed to the at least one bank before expiration of the timer value.

13. The method of claim 12, further comprising:
    increasing the timer value by an amount corresponding to a read time interval associated with the read operation.

14. The method of claim 10, further comprising:
    generating a status signal indicating a failure of the write operation before expiration of the minimum time interval.

15. The method of claim 10, further comprising:
    indicating a successful write operation by not conveying a status signal within the minimum time interval.

16. The method of claim 10, further comprising:
    comparing an address of a read operation to an address associated with the write operation, the read operation received subsequent to the write operation; and
    in response to the comparing resulting in a match condition, reading the write data in the write data register and returning the write data as read data to the memory controller.

17. A packaged semiconductor memory, comprising:
    a substrate;
    a plurality of storage class memory (SCM) devices disposed on the substrate, each of the plurality of SCM devices comprising an array of SCM memory cells organized into at least one bank;

a write data register to temporarily store write data associated with a write operation directed to the at least one bank; and a timer register to store a timer value associated with the temporarily stored write data, the timer value representing a time interval beginning with initiation of the write operation by a memory controller and ending with the write data written to the at least one bank, wherein a subsequent write operation to the bank is constrained until after expiration of the timer value.

18. The packaged semiconductor memory according to claim 17, wherein the initiation of the write operation is based on receipt of an activation command at the memory module.

19. The packaged semiconductor memory according to claim 17, wherein the module receives signal components of a read operation directed to the at least one bank before expiration of the timer value.

20. The packaged semiconductor memory according to claim 19, wherein the timer value is increased by an amount corresponding to a read time interval associated with the read operation.

\* \* \* \* \*